United States Patent [19]

Heidorn et al.

[11] Patent Number: 5,615,852
[45] Date of Patent: Apr. 1, 1997

[54] CABLE CLIP

[75] Inventors: Richard H. Heidorn, Lombard; Mohammad Masghati, Addison, both of Ill.

[73] Assignee: Illinois Tool Works Inc., Glenview, Ill.

[21] Appl. No.: 427,678

[22] Filed: Apr. 24, 1995

[51] Int. Cl.⁶ ........................................................ F16L 3/08
[52] U.S. Cl. .......................... 248/74.5; 174/135; 248/68.1
[58] Field of Search ..................... 248/74.5, 74.2, 248/74.1, 68.1, 73, 65, 71; 24/545; 174/157, 156, 158 F, 159, 161 R, 161 F, 135

[56] References Cited

U.S. PATENT DOCUMENTS

| | | | |
|---|---|---|---|
| 2,570,957 | 10/1951 | Lee | 248/71 |
| 2,681,196 | 6/1954 | Lind | 248/71 |
| 3,016,220 | 1/1962 | Rose | 248/74 |
| 3,430,903 | 3/1969 | Mathes | 248/68 |
| 3,430,905 | 3/1969 | Pepe | 248/74 |
| 3,951,367 | 4/1976 | Hagelberg | 248/71 |
| 4,127,250 | 11/1978 | Swick | 248/71 |
| 4,260,123 | 4/1981 | Ismert | 248/74 R |
| 4,582,288 | 4/1986 | Ruehl | 248/547 |
| 4,588,152 | 5/1986 | Ruehl et al. | 248/71 |
| 4,826,111 | 5/1989 | Ismert | 248/49 |
| 4,842,237 | 6/1989 | Wollar | 248/548 |
| 4,903,920 | 2/1990 | Merritt | 248/71 |
| 4,903,921 | 2/1990 | Logsdon | 248/74.5 |
| 4,936,530 | 6/1990 | Wollar | 248/71 |
| 4,961,554 | 10/1990 | Smowton | 248/68.1 |
| 4,971,272 | 11/1990 | Gudridge et al. | 248/74.5 |
| 4,978,090 | 12/1990 | Wichert et al. | 248/74.1 |
| 5,040,752 | 8/1991 | Morrison | 248/71 |
| 5,054,741 | 10/1991 | Ismert | 248/74.5 |
| 5,192,040 | 3/1993 | Washizu | 248/74.5 |
| 5,302,070 | 4/1994 | Kameyama et al. | 411/437 |
| 5,316,245 | 5/1994 | Ruckwardt | 248/73 X |
| 5,411,228 | 5/1995 | Morawa et al. | 248/74.5 |

FOREIGN PATENT DOCUMENTS

| | | | |
|---|---|---|---|
| 836387 | 3/1970 | Canada | 248/66 |
| 1077284 | 3/1960 | Germany. | |
| 2435995 | 12/1976 | Germany. | |

*Primary Examiner*—Ramon O. Ramirez
*Attorney, Agent, or Firm*—Schwartz & Weinrieb

[57] ABSTRACT

A cable clip for resiliently retaining coaxial cables and the like against a mounting surface is provided which includes cable receiving means for accommodating cables of different-sized diameters in order to minimize nicks or dents thereto. In a preferred embodiment, the cable receiving means includes double cable receiving openings defined by first and second side walls of a housing member which are separated by a mid-portion, and a pair of flexible, resilient first and second fingers extending downwardly from the upper surface of the housing member.

21 Claims, 2 Drawing Sheets

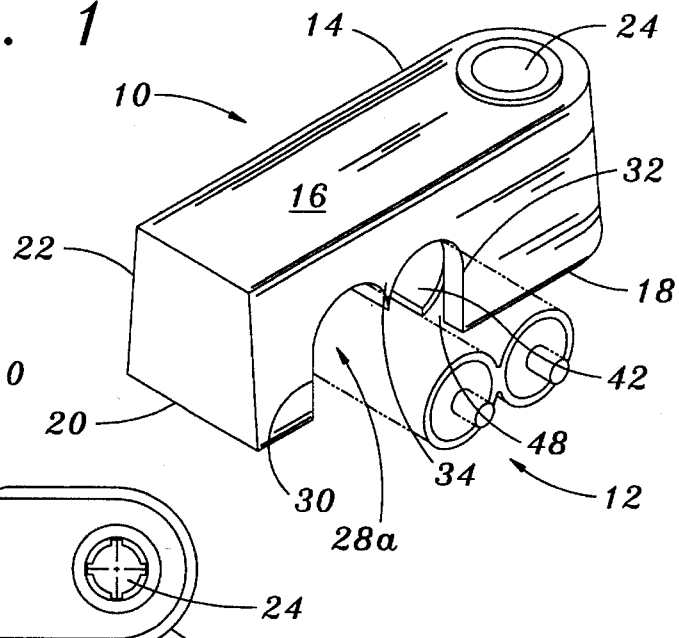
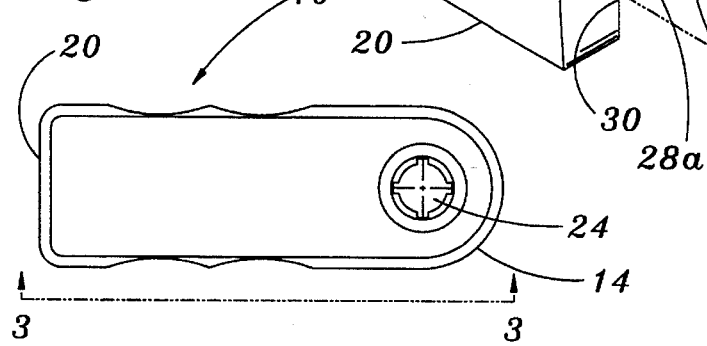
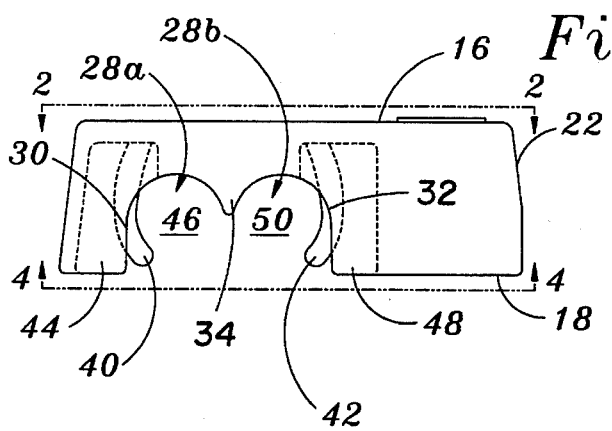
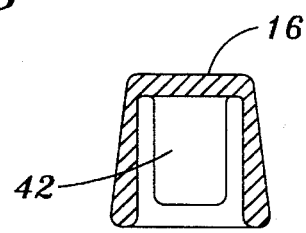
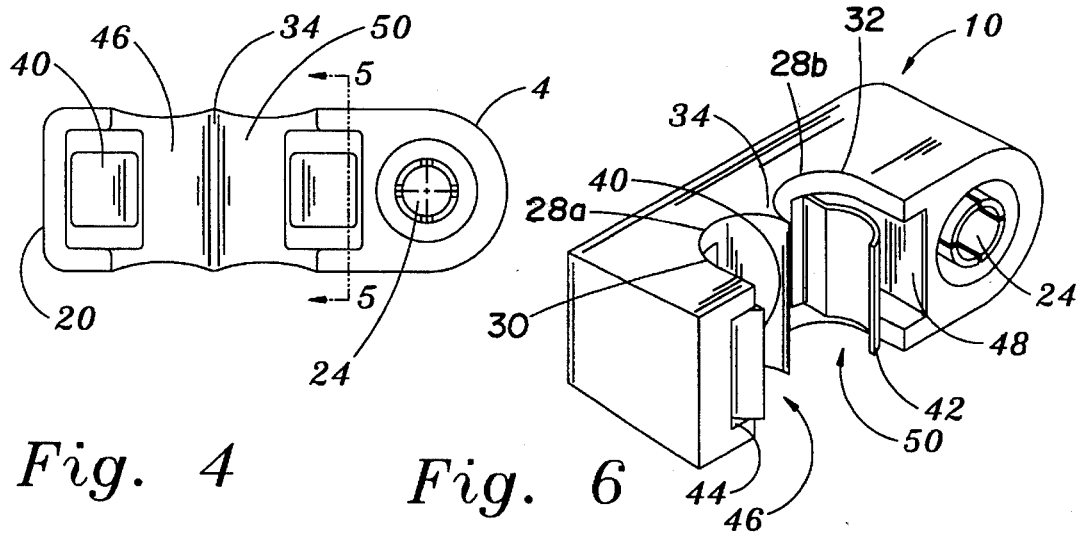

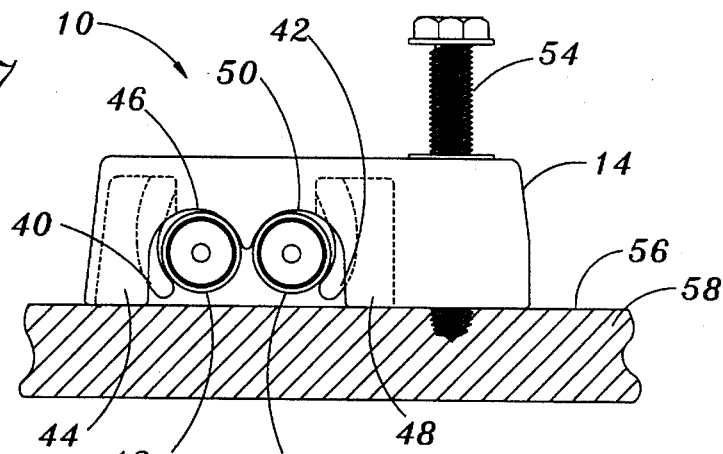
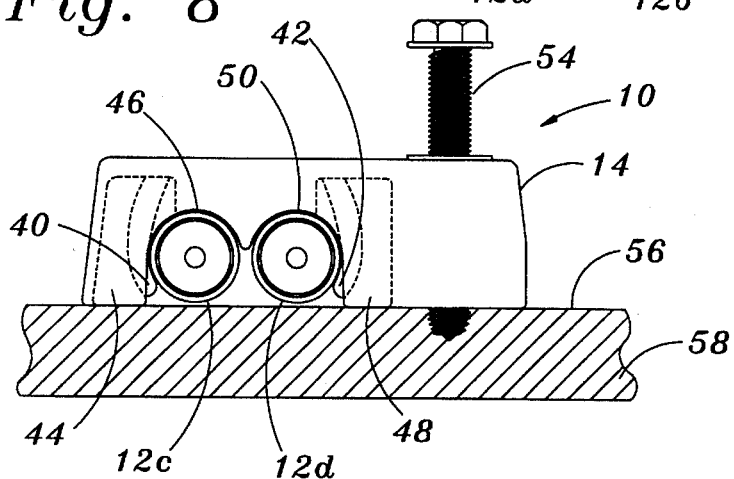
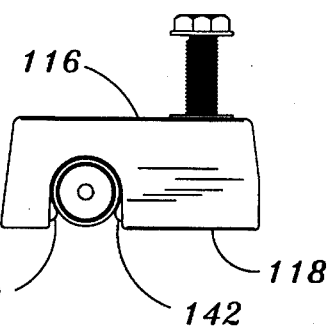
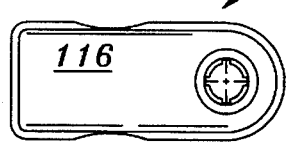
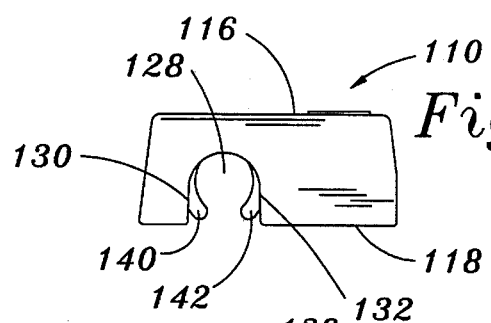
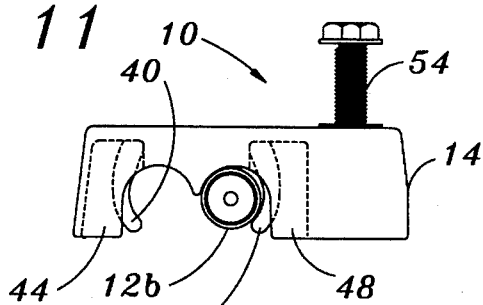
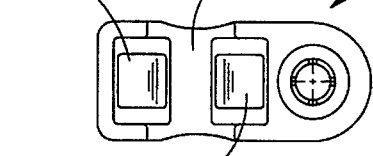

CABLE CLIP

BACKGROUND OF THE INVENTION

1. Field of the Invention This invention relates generally to wire clamping clips and more particularly, it relates to an improved cable clip for resiliently retaining coaxial cables of different sizes in diameter against a mounting surface such as a building and the like in order to minimize damage to the cables with nicks, dents or bends.

2. Description of the Prior Art

As is generally well-known in the art, there are many types of clips for retaining wiring harnesses, electric wires, control cables and the like against a mounting surface. Typically, such clips are used to hold an insulated electrical cable against to a building structure such as a floor, wall or roof. The clip is generally installed by inserting a nail, screw or similar fastening device through a hole in the clip and then into the mounting surface. Further, it is known that the cables used are generally of different sizes in diameter which require different-sized clips.

The retainer clips used heretofore have been either unable to resiliently secure the cables or, where some securement was achieved, to perform this function without damaging the cables when the retainer clip was frictionally attached to the cable. As is well known, nicks, dents or bends in cables used for high speed data transmission will cause distortion to occur. In addition, none of the prior art retainer clips were ideally suitable for securing cables of varying sizes in diameter. As a result, the installers would be required to carry a number of different-sized clips in order to accommodate the varying range of cable diameters. Further, from a manufacturing standpoint of view there was a need to produce a number of different-sized clips in order to match the different cable sizes, thereby increasing the production and labor costs.

It would therefore be desirable to provide an improved cable clip for retaining cables against a mounting surface so as to minimize distortion from occurring due to nicks, dents or bends therein. Further, it would be desirable to have a cable clip which is of a unique construction so as to be capable of accommodating cables of different sizes in diameter, thereby reducing manufacturing and inventory problems.

A prior art search directed to the subject matter of this application in the U.S. Patent and Trademark Office revealed Canadian Patent No. 836,387; German Patent Nos. 1,077,284 and 2,435,995; and the following U.S. Letters Patent:

| | |
|---|---|
| 2,570,957 | 4,582,288 |
| 2,681,196 | 4,588,152 |
| 3,430,903 | 4,903,920 |
| 3,951,367 | 5,040,752 |
| 4,127,250 | 5,192,040 |
| 3,016,220 | 4,936,530 |
| 3,430,905 | 4,961,554 |
| 4,260,123 | 4,971,272 |
| 4,826,111 | 4,978,090 |
| 4,842,237 | 5,054,741 |
| 4,903,921 | 5,302,070 |

In U.S. Pat. No. 2,681,196 to Otto H. Lind issued on Jun. 15, 1954, there is disclosed a holding clip stamped from a sheet metal blank and which includes a main body 3 having an arcuate recess 4 formed between the end portions 5 and 6.

In U.S. Pat. No. 3,951,367 to Anders Hagelberg issued on Apr. 20, 1976, there is shown in FIG. 1 a fastener which includes a portion 1 having an inner pleated surface so as to make possible the adaptation to different dimensions of a cable, tube or similar element.

In U.S. Pat. No. 4,582,288 to William E. Ruehl issued on Apr. 15, 1986, and assigned to the same assignee as in the present invention, there is disclosed a wire routing clip assembly which includes a block member 12 having a plurality of recesses 26, 28 formed in its bottom face 24 so as to permit the selection of wires of different sizes to be routed therethrough. The parallel transverse recesses 26 in FIG. 1 are particularly adapted to route a siamese type cable 38 or in the alternative a pair of single cables side by side.

In U.S. Pat. No. 4,588,152 to William E. Ruehl et al. issued on May 13, 1986, and assigned to the same assignee as the present invention, there is taught a wire clamping clip 10 comprised of a base member 12, a bushing 14 and a hardened pin 16. The base member 12 is formed as a body 18 having a wire receiving recess 24 disposed between side walls 26 and 28. In order to accommodate slight variations in the diameter sizes of a cable, a rib 25 is provided on the side wall 26 and a rib 27 is provided on the side wall 28. As can best be seen from FIG. 5, the ribs 25 and 27 are tapered inwardly from the end adjacent the working surface 20 to the top of the bullet-shaped slot 34 so as to retain the cable C therein. However, as the cables of larger diameters are inserted into the recess 24, they tend to become more distorted so as to cause possible physical damage or destruction thereto.

In U.S. Pat. No. 4,903,920 to James A. Merritt issued on Feb. 27, 1990, there is disclosed in FIG. 2(a) a clip assembly 2a for retaining a cable against a mounting surface which includes a double tunnel-shaped cable retaining opening 50a.

In U.S. Pat. No. 4,842,237 to Burnell J. Wollar issued on Jun. 27, 1989, there is shown a one-piece wire retainer clip which includes a pair of resiliently movable spaced-apart legs 36, 38 connected to a first tubular member 34 and defining a wire-receiving slot 33. A closure plate 62 is connected to and movable with a second tubular member 60 which is slidable on the first tubular member. Latches 78, 80 on the closure plate are releasably engagable with flanges 37, 39 formed on the resilient legs 36, 38 so as to secure wires 20 therebetween.

In U.S. Pat. No. 5,054,741 to Joseph P. Ismert issued on Oct. 8, 1991, there is illustrated a tube hanger for selectively supporting at least two different sizes of tubes from a mounting surface. The tube hanger 1 includes a body portion 2 having a base 3. A flexible, resilient arm 13 extends outwardly from the base so as to define a cavity 14 for receipt of a tube having a first predetermined size. Supplemental fingers 21 are connected to the arms generally at a mid-point 22 thereof and extend substantially concentrically with the arms 13 so as to cradle and grip a tube having a second predetermined size of lesser diameter than the first tube.

In application Ser. No. 08/167,158 filed on Dec. 16, 1993, and entitled "Cable Clip" (Attorney Docket No. 6864), there is disclosed a cable clip for retaining coaxial cables and the like against a mounting surface which is of a construction so as to accommodate cables of different sizes. The cable clip includes a pair of spaced-apart first and second ribs 40a and 40b formed on the side wall 36 and a third rib 40c disposed at the mid-point on the opposite side wall 38. The ribs 40a–40c define cable retention means which serve to contain two different types of coaxial cables. This is accomplished by forming each of the ribs with an upper region 42 and a lower region 44. The relatively smaller coaxial cable is held essentially within the opening 34 by the lower regions 44 of the ribs 40a–40c. The larger cable is held within the opening by both the lower and upper regions 42 and 44 of the ribs 40a–40c. This application Ser. No. 08/167,158 is also assigned to the same assignee as in the present invention and is hereby incorporated by reference in its entirety.

The remaining patents uncovered from the search but not specifically discussed are merely cited to show the general state of the art and are directed to clamping devices for securing elongated members.

None of the prior art uncovered in the search discloses a cable clip of a unique construction for resiliently retaining coaxial cables against a mounting surface such as that of the present invention in order to minimize damage to the cables with nicks, dents or bends. This is accomplished in the present invention by a pair of flexible fingers formed in the upper surface of the housing which flex or bend outwardly so as to resiliently and frictionally grip the sides of the cables of larger diameters minimizing deformation or distortion of the cable.

SUMMARY OF THE INVENTION

Accordingly, it is a general object of the present invention to provide an improved cable clip, for resiliently retaining coaxial cables of different-sized diameters against a mounting surface, which is relatively simple and economical to manufacture and assemble.

It is an object of the present invention to provide an improved cable clip for resiliently retaining coaxial 15 cables of different sizes in diameter against a mounting surface in order to minimize damage to the cables with nicks, dents or bends.

It is another object of the present invention to provide an improved cable clip, for resiliently retaining coaxial cables and the like against a mounting surface, which includes a pair of flexible fingers formed in the upper surface of the housing so as to accommodate cables of different sizes.

In accordance with these aims and objectives, the present invention is concerned with the provision of a cable clip, for resiliently retaining cables against a mounting surface, which includes a housing member having an upper surface and a lower surface disposed substantially parallel to the upper surface. A fastener hole extends between the upper surface and the lower surface. A cable receiving means is formed in the lower surface for accommodating cables of different-sized diameters so as to minimize nicks or dents thereto. The cable receiving means includes double cable receiving openings defined by first and second side walls separated by a mid-portion and a pair of flexible, resilient first and second fingers extending downwardly from the upper surface.

In another embodiment of the present invention, the cable receiving means includes only a single cable receiving opening defined by first and second side walls and a pair of flexible, resilient first and second fingers extending downwardly from the upper surface of the housing member.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout the several view, and wherein:

FIG. 1 is a perspective view of a cable clip for resiliently retaining a siamese type coaxial cable consisting of a pair of coaxial cables, constructed in accordance with the principles of the present invention;

FIG. 2 is a top plan view of the cable clip of FIG. 1;

FIG. 3 is a side elevational view, taken along the lines 3—3 of FIG. 2;

FIG. 4 is a bottom plan view, taken along the lines 4—4 of FIG. 3;

FIG. 5 is an enlarged, cross-sectional view taken along the lines 5—5 of FIG. 4;

FIG. 6 is a bottom perspective view of the cable clip;

FIG. 7 is a side elevational view of the cable clip of FIG. 1, illustrating its use in mounting a pair of coaxial cables of a relatively smaller diameter;

FIG. 8 is a side elevational view, similar to FIG. 7, but illustrating the mounting of a pair of coaxial cables of a relatively larger diameter;

FIG. 9 is a perspective view of a second embodiment of a cable clip for resiliently retaining a single coaxial cable, according to the present invention;

FIG. 10 is a top plan view of the cable clip of FIG. 9;

FIG. 11 is a side elevational view thereof;

FIG. 12 is a bottom plan view thereof; and

FIG. 13 is a view similar to FIG. 7, but illustrating the mounting of a single coaxial cable.

DESCRIPTION OF THE ILLUSTRATED EMBODIMENTS

Referring now in detail to the various views of the drawings, there is illustrated in FIGS. 1 through 8 an improved dual cable clip 10 of a unique construction for resiliently retaining a siamese type coaxial cable 12 or in the alternative a pair of single cables in a side-by-side arrangement against a mounting surface. The cable clip 10 is comprised of a substantially rectangularly-shaped housing member 14 which is formed AS a single piece of resilient slightly deformable plastic material, such as polycarbonate, Nylon or the like, by a conventional process of injection molding. The housing member 14 has an upper surface 16 and a lower surface 18 which is parallel to the upper surface 16. The housing member also has a depth dimension 20 and a height dimension 22.

The upper surface 16 of the housing member 22 includes a fastener hole 24 for receiving a fastening device such as a screw 54 or the like. The fastener hole 24 extends between the upper surface 16 and the lower surface 18. There is provided in the lower surface 18 double tunnel-shaped cable receiving openings 28a and 28b which are formed in the housing 14 so as to extend between the first and second side walls 30 and 32, respectively. The cable receiving openings 28a, 28b are adapted to accommodate cables of different-sized diameters in a manner which will become apparent presently.

The two cable receiving openings 28a and 28b are separated from each other by a mid-portion 34. A pair of flexible, resilient fingers 40 and 42 extend downwardly from the upper surface 16 of the housing member 14 generally as an inwardly-directed arcuate segment. The flexible finger 40 is spaced apart from the inside surface of the first side wall 30 so as to define a first pocket or recess 44. The area between the inside surface of the flexible finger 40 and the mid-portion 34 defines a first cavity 46 for receiving a first cable. Similarly, the flexible finger 42 is spaced apart from the inside surface of the second side wall 32 so as to define a second pocket or recess 48. The area between the inside surface of the flexible finger 42 and the mid-portion 34 define a second cavity 50 for receiving a second cable.

It should be clearly understood that each of the fingers 40 and 42 is adapted to be flexed at its point of attachment to the upper wall portion 16 so as to permit it to be able to move outwardly into the respective first and second pockets 48, 50. The flexing is accomplished by the inherent flexibility of the material around the fingers attached to the upper wall portions of the housing member.

As illustrated in FIG. 7, the cable clip 10 is used for resiliently retaining a siamese type coaxial cable consisting of a pair of relatively smaller-sized diameter coaxial cables 12a, 12b (that is, RG-59/U type) as a screw 54 is inserted through a mounting surface 56 and into a wall support 58. It will be noted that the smaller cable 12a is essentially held within the first cavity 46 and that the smaller cable 12b is held essentially within the second cavity 50. Since the inside surfaces of the fingers 40, 42 resiliently and frictionally grip the sides of the smaller cables 12a, 12b nicks, dents or bends applied to the cable are substantially reduced so as to minimize any deformation or distortion thereto.

In FIG. 8, the cable clip 10 is used for resiliently retaining a siamese type coaxial cable consisting of a pair of relatively larger-sized diameter coaxial cables 12c, 12d (that is, RG-6/U type) as the screw 54 is inserted into the mounting surface 56. As will be appreciated, the larger cable 12c is held essentially within the same first cavity 46, and the larger cable 12b is held essentially within the same second cavity 50. Since the inside surfaces of the fingers 40, 42 again resiliently and frictionally grip the sides of the larger cables 12c and 12d, there will be minimal deformation or distortion caused to the cables 12c and 12d. It is important to note that the fingers 40, 42 flex or bend outwardly into the respective first and second pocket areas 44 and 48, which are sized to receive the fingers 40, 42, so as to accommodate the larger-sized diameter cables 12c, 12d in order to minimize any damage thereto.

In FIGS. 9–12, there is shown a second embodiment of a cable clip 110 of the present invention for resiliently retaining a single coaxial cable against a mounting surface. It will be noted that FIGS. 9–12 correspond closely to FIGS. 1–4 of the first embodiment. The only differences reside in that the lower surface of the housing member is formed with a single tunnel-shaped cable receiving opening 128 which is formed between the side walls 130 and 132. Since the flexible fingers 140 and 142 are identical in their structure and operation to the fingers in FIGS. 1–4, a detailed description of the fingers 140 and 142 will not be repeated.

In use, the cable installer takes the dual cable clip 10 which already has in place the screw 54 and initially places the pair of cables 12a, 12b or 12c, 12d into the respective cable receiving openings 28a and 28b of the cable clip. Then, the lower surface 18 of the cable clip 10 is positioned firmly against the mounting surface 56 and the pre-inserted screw 54 is threaded into the wall support 58 until its head is flush against the upper surface 16 of the cable clip 10. It should be understood by those skilled in the art that the dual cable clip 10 may be used to secure only a single coaxial cable as illustrated in FIG. 13 rather than the siamese type cable. Further, the use of the single cable clip 110 of FIGS. 9–12 is identical to that just described with respect to the cable clip 10 and thus will not be repeated.

From the foregoing detailed description, it can thus be seen that the present invention provides an improved cable clip, for resiliently retaining coaxial cables and the like against a mounting surface, which includes cable receiving means formed in the lower surface of the housing member for accommodating cables of different-sized diameters in order to minimize nicks or dents thereto. The cable receiving means includes double cable receiving openings defined by first and second side walls separated by a mid-portion and a pair of flexible, resilient fingers extending downwardly from the upper surface of the housing. In an alternate embodiment, the cable receiving means is formed of a single cable receiving opening defined by first and second side walls and a pair of flexible, resilient fingers.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A cable clip for resiliently retaining cables, comprising:

a housing member having an upper surface and a lower surface disposed substantially parallel to said upper surface; and cable receiving means formed within said lower surface of said housing member for accommodating cables of different-sized diameters and comprising a double cable receiving opening defined by first and second arcuate walls separated by a dependent mid-portion and a pair of flexible, resilient fingers for respectively cooperating with said dependent mid-portion so as to respectively retain said cables of different-sized diameters within said double cable receiving opening and between said fingers and said mid-portion.

2. A cable clip as claimed in claim 1, wherein each one of said pair of fingers is formed of an inwardly-directed arcuate segment whose inside surface serves to resiliently and frictionally grip the sides of said cables.

3. A cable clip as claimed in claim 2, wherein:

the area defined between said inside surface of a first one of said pair of fingers and said mid-portion defines a first cavity for receiving a first cable; and the area defined between said inside surface of a second one of said pair of fingers and said mid-portion defines a second cavity for receiving a second cable.

4. A cable clip as claimed in claim 3, wherein:

said first finger is spaced apart from said first arcuate wall within which is defined a first pocket; and said second finger is spaced apart from said second arcuate wall within which is defined a second pocket.

5. A cable clip as claimed in claim 4, wherein said first and second fingers flex outwardly into said respective first and second pockets for resiliently and frictionally gripping cables of a relatively larger size in diameter.

6. A cable clip as claimed in claim 1, wherein said housing member is substantially rectangular in shape.

7. A cable clip as claimed in claim 1, wherein said housing member is formed in a single piece of resilient, slightly deformable plastic material.

8. A cable clip as claimed in claim 7, wherein said plastic material is a polycarbonate.

9. A cable clip as claimed in claim 7, wherein said housing member is fabricated by an injection molding process.

10. A cable clip as set forth in claim 1, further comprising:

fastener hole means defined within said housing member for accommodating a fastener for securing said cable clip upon a mounting surface.

11. A cable clip for resiliently retaining cables, comprising:

a housing member having an upper surface and a lower surface disposed substantially parallel to said upper surface; and cable receiving means formed within said lower surface of said housing member for accommodating cables of different-sized diameters and comprising at least one cable receiving opening defined by first and second oppositely disposed side walls, a pair of oppositely disposed flexible, resilient fingers movably mounted within said at least one cable receiving opening between different expansible positions for accommodating said cables of different-sized diameters, and pocket means defined interiorly within said first and second oppositely disposed side walls of said housing member for receiving said flexible, resilient fingers as said flexible, resilient fingers expand outwardly away from each other in order to accommodate relatively large diameter cables.

12. A cable clip as claimed in claim 11, wherein each of said oppositely disposed fingers is formed of an inwardly-directed arcuate segment whose inside surface serves to resiliently and frictionally grip the sides of said cable.

13. A cable clip as claimed in claim 12, wherein:

the area defined between said inside surface of a first one of said pair of fingers and said inside surface of a second one of said pair of fingers defines a cavity for receiving said cable.

14. A cable clip as set forth in claim 11, further comprising:

fastener hole means defined within said housing member for accommodating a fastener for securing said cable clip upon a mounting surface.

15. A cable clip as claimed in claim 11, wherein said housing member is substantially rectangular in shape.

16. A cable clip as claimed in claim 11, wherein said housing member is formed in a single piece of resilient, slightly deformable plastic material.

17. A cable clip as claimed in claim 16, wherein said plastic material is a polycarbonate.

18. A cable clip as claimed in claim 16, wherein said housing member is fabricated by an injection molding process.

19. A cable clip for resiliently retaining cables, comprising:

a housing member having an upper surface and a lower surface disposed substantially parallel to said upper surface; and cable receiving means formed within said lower surface of said housing member for accommodating cables of different-sized diameters and comprising cable receiving opening means defined by first and second oppositely disposed, laterally spaced separate resilient finger means, dependently and separately mounted upon said upper surface of said housing member, for resiliently gripping the sides of said cables of different-sized diameters.

20. A cable clip as claimed in claim 19, wherein said housing member is formed in a single piece of resilient, slightly deformable plastic material.

21. A cable clip as set forth in claim 19, further comprising:

fastener hole means defined within said housing member for accommodating a fastener for securing said cable clip upon a mounting surface.

\* \* \* \* \*